United States Patent [19]
Villemin et al.

[11] Patent Number: 4,987,642
[45] Date of Patent: Jan. 29, 1991

[54] SYSTEM FOR CUTTING MEAT FROM BONE

[75] Inventors: Daniel Villemin, Chennevieres S/Marne; Janusz Plusa, Champigny sur Marne; Daniel Guilbaud, Saint Fulgent; Jean Leclere, Creteil; Paul Romand, Valence, all of France

[73] Assignees: Etablissements Arrive S.A., Saint Fulgent; Union Financiere Pour le Developpement de L'Economie* Cerealiere Unigrains, Seine, both of France

[21] Appl. No.: 464,512

[22] Filed: Jan. 12, 1990

[30] Foreign Application Priority Data

Jan. 13, 1989 [FR] France .............................. 89 00571

[51] Int. Cl.$^5$ .............................................. A22C 21/00
[52] U.S. Cl. ..................................... 452/136; 30/381; 83/788; 452/139
[58] Field of Search ...................... 17/11, 52, 46, 1 G; 30/381, 380; 83/788

[56] References Cited

U.S. PATENT DOCUMENTS

| | | | |
|---|---|---|---|
| 3,982,299 | 9/1976 | Kompan | 17/23 |
| 4,019,223 | 4/1970 | Baker | 17/11 |
| 4,718,146 | 1/1988 | Adkison | 17/52 |
| 4,793,025 | 12/1988 | Melville et al. | 17/46 |

Primary Examiner—Willis Little

Attorney, Agent, or Firm—Herbert Dubno; Andrew Wilford

[57] ABSTRACT

An apparatus for separating a soft material such as meat from a hard material such as bone has a generally stationary support and a holder that supports an object comprised of the hard and soft materials stationarily adjacent the support with an interface between the hard and soft material extending to a cutting plane. A chassis is pivotal on the support about a chassis axis transverse to the plane and an outer pulley is pivotal on the chassis remote from the support and generally tangent to the plane. A carriage displaceable on the support transversely of the plane pivotally suports an inner pulley pivotal on the carriage close to the support and spaced along the plane from the outer pulley. One of the pulleys is rotated to advance the chain. Thus it is therefore possible to pivot the chassis forward on the support and thereby engage the chain in the meat on the one side of the plane, then to displace the carriage transversely to pull the inner pulley at least partially to the other side of the plane and thereby move the chain in the object toward the plane while rotating the pulleys and advancing the chain. The chassis is then pivoted further forward on the support so as to slide the chain along the interface and separate the hard material from the soft material while slowing pulling the inner pulley toward the one side.

12 Claims, 2 Drawing Sheets

SYSTEM FOR CUTTING MEAT FROM BONE

FIELD OF THE INVENTION

The present invention relates to a system for recovering meat from bone in a meat-packing operation. More particularly this invention concerns a meat-removing apparatus.

BACKGROUND OF THE INVENTION

In the preparation of a large bird for sale it is standard to cut the bird up after slaughter into several pieces. With a turkey the bird is cleaned by removing the viscera and then rinsing the animal. Then it is hung from a conveyor chain which moves it through a plurality of stations at which pieces are cut off it, it is deboned, and so on. Clearly this process requires a substantial amount of manual work and has the considerable disadvantage that the quality of the end product depends directly on the abilities of the people doing the various steps. Furthermore a normally significant amount of meat is left hanging on the body or lodged in cavities thereof.

Once the appendages—the wings of a bird, the fins of a fish, the limbs of a lamb, beef, or pig carcass—have been removed it is necessary to separate the meat from the bone. This must be done so as to recover the largest possible pieces of meat while leaving the smallest amount on the bone or cartilage. In addition this process must be carried out at the highest possible speed, and with the smallest possible risk of injury to the worker.

While chain-type saws have been suggested to automate this procedure in U.S. Pat. Nos. 4,422,216 and 4,793,232, the operations still remains fairly difficult.

Objects of the Invention

It is therefore an object of the present invention to provide an improved apparatus for separating a soft material, typically meat, from a hard material, typically bone or cartilage.

Another object is the provision of such an improved apparatus for separating a meat from bone or cartilage which overcomes the above-given disadvantages, that is which largely mechanizes this operation while still leaving it fairly safe.

A further object is to provide an improved method of separating meat from an animal body, whether this is a bird, a fish, or any other meat animal.

SUMMARY OF THE INVENTION

An apparatus for separating a soft material such as meat from a hard material such as bone according to this invention has a generally stationary support and a holder that supports an object comprised of the hard and soft materials stationarily adjacent the support with an interface between the hard and soft material extending to a cutting plane. A chassis is pivotal on the support about a chassis axis transverse to the plane and an outer pulley is pivotal on the chassis remote from the support and generally tangent to the plane. A carriage displaceable on the support transversely of the plane pivotally supports an inner pulley pivotal on the carriage close to the support and spaced along the plane from the outer pulley. One of the pulleys can be rotated to advance the chain.

With this system it is therefore possible to pivot the chassis forward on the support and thereby engage the chain in the meat on the one side of the plane, then to displace the carriage transversely to pull the inner pulley at least partially to the other side of the plane and thereby move the chain in the object toward the plane while rotating the pulleys and advancing the chain. The chassis is then pivoted further forward on the support but at a slower speed so as to slide the chain along the interface and separate the hard material from the soft material while slowing pulling the inner pulley toward the one side. At the end of the cut the chassis is reverse pivoted and the pulley rotation is stopped. This therefore allows for a largely automated procedure of separating the meat from the bone, whether this is done on a bird, a fish, or other meat animal. The procedure can be almost entirely automated and will at the same time be relatively safe while ensuring that little meat is left on the carcass.

The drive means according to this invention is connected for safety reasons to the outer pulley. In addition the chassis is provided with transversely extending guide rods carrying the carriage, and the apparatus has a transversely expansible and contractile fluid-powered actuator braced between the carriage and the chassis. Furthermore to accommodate objects of different size that are to have soft material cut from them the apparatus comprises a stationary base and the support is pivoted on the base about a base axis generally coinciding with the plane and generally perpendicular to the chassis axis.

In accordance with another feature of this invention a fluid-powered actuator is provided that is expansible and contractile generally in the plane and connected between the support and the chassis for pivoting same about the chassis axis. In addition a guide element extending generally in the plane is engageable with the object and is supported on the base for pivoting about an element axis parallel to the chassis axis for movement of the element generally in the plane.

DESCRIPTION OF THE DRAWINGS

The above and other objects, features, and advantages will become more readily apparent from the following, reference being made to the accompanying drawing in which.

SPECIFIC DESCRIPTION

Figure 1:
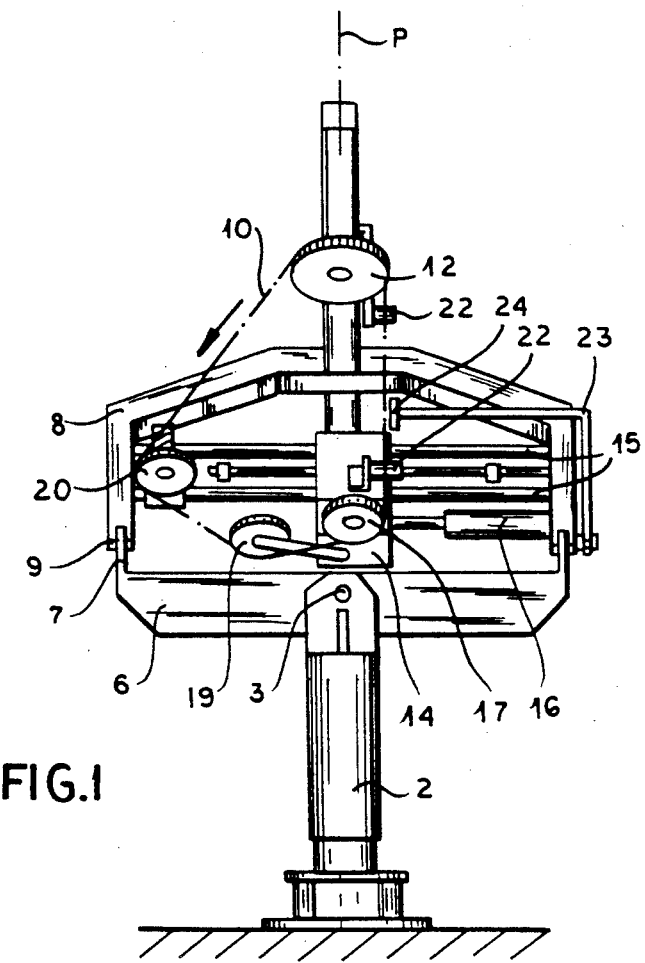
FIG. 1 is a small-scale end view of the apparatus according to this invention.

As seen in FIG. 1 an apparatus for stripping meat from a turkey body 5 from which the neck and wings have been removed as described in copending patent applications (U.S. Ser. Nos. 4646513 & 464515) comprises a base 2 that is stationarily mounted on the floor and that carries a support 6 for rotation about a horizontal longitudinal axis 3. The turkey body 5 is supported with its sternum 21 upward in a cutting plane P.

The support 6 has a pair of arms 7 that support a chassis 8 for pivoting about a horizontal axis 9 perpendicular to the plane P. This chassis 8 extends outward along the plane P and has an outer end carrying an outer pulley 12, and an inner end carrying a carriage 14 itself supporting an inner pulley 17 over which are spanned a cutting chain as described in above-mentioned Pat. No. 4,793,232. The carriage 14 is supported on guide rods 14 extending perpendicular to the plane P for movement of this carriage 14 along these rods 15, and also supports via an arm 18 a tensioning roller 19 over which the chain 10 is spanned also. A further guide roller 20 fixed on the chassis 8 also supports the chain 10, and downwardly effective guide rollers 22 provided on the inside and outside ends of the chassis 8 prevent its main stretch running from the roller 12 to the roller 17 from being deflected upward. All of the pulleys 12, 17, 19, and 20 rotate about parallel axes.

A cylinder 25 pivoted at 26 on the support 6 is operated by a controller 29 and has a piston rod 27 connected to a fitting 28 pivoted on the chassis 8 so that this cylinder 25 can pivot the chassis 8 on the support 6 about the axis 9. A motor 13 is connected via unillustrated means to the outer pulley 12 to move the chain 10 so that it advances outward, that is from the inner roller 17 to the outer roller 12 in the main stretch extending between these rollers and engaged by the guides 22. A cylinder 16 also operated by the controller 29 is provided to shift the carriage 14 transversely of the plane P.

A guide element 22 adapted to engage the sternum 21 of the bird 5 is carried on an arm 23 pivoted on the axis 9 so that this element 22 can move in the plane P.

Figure 2:
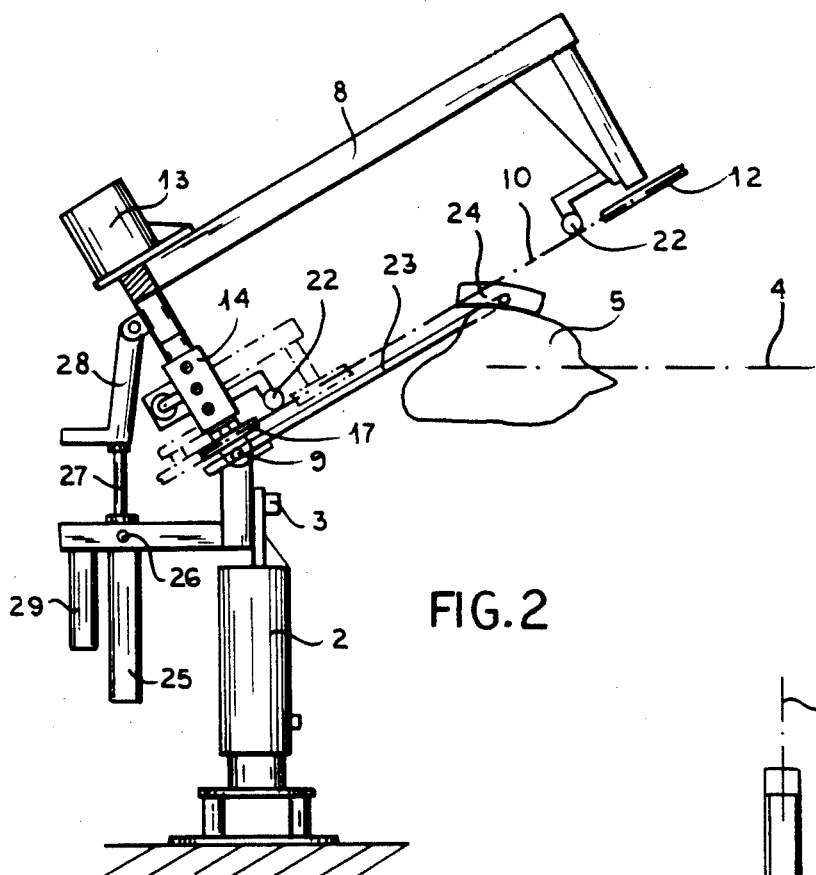
FIG. 2 is a side view of the apparatus.
Figure 3:
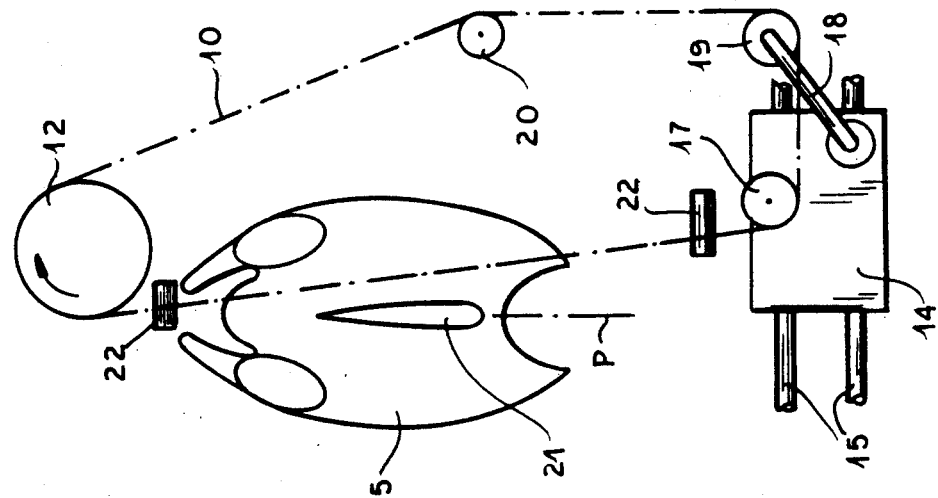

The apparatus described above is operated as follows:

To start with the apparatus is in the position of FIGS. 2 and 3, with the outer pulley 12 raised and the main stretch of the chain 10 spaced above the bird 5, the guide 24 resting on the sternum 21 thereof, and the pulley 17 to the one side of the plane P. From this position once an object to be stripped of soft material is detected lying on the plane the cylinder 25 is extended by the controller 29 until the chain 10 glides over the element 24 and bites into the meat of the bird 5 on the one side of the bone 21.

Figure 4:
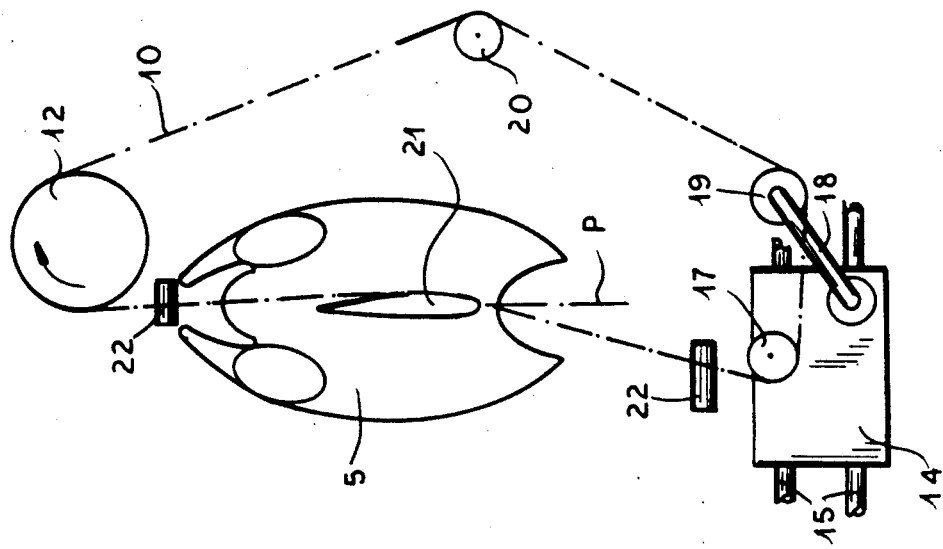

Thereupon the controller 29 slows the pivotal descent of the chain 10 and operates the cylinder 16 to shift the carriage 14 to the other side of the plane P as shown by FIG. 4, pulling the chain 10 tight against the sternum 21.

Figure 5:
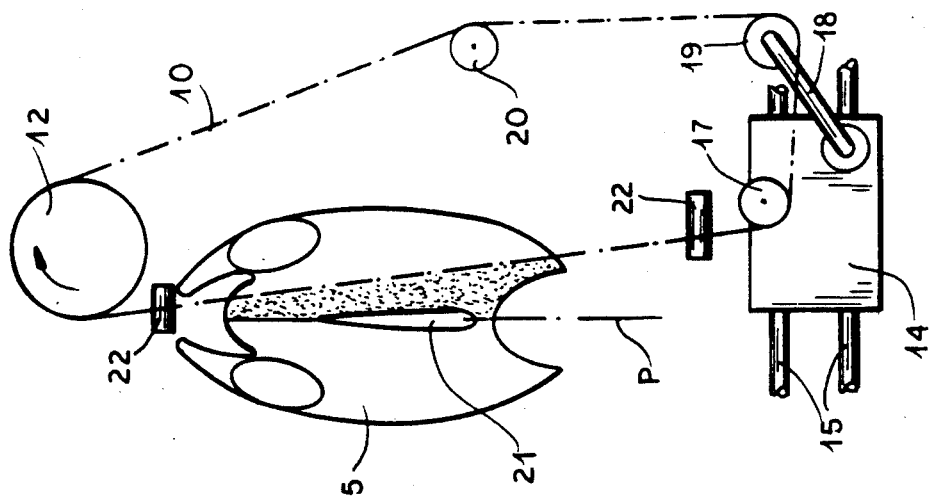
FIGS. 3, 4, and 5 are larger-scale top views illustrating how the apparatus works.

Subsequently the cylinder 25 is expanded slowly to move the chain 10 down over the skeleton of the bird 5 while the cylinder 16 shifts the carriage 14 slowly across the plane P as shown by FIG. 5. This effectively cuts a breast-meat fillet from the bird 5. At the end of the operation the cylinder is contracted to raise the chassis 8 and free the chain 10 and the motor 13 is stopped.

We claim:

1. An apparatus for separating a soft material such as meat from a hard material such as bone, the apparatus comprising:
    a generally stationary support;
    means for holding an object comprised of the hard and soft materials stationarily adjacent the support with an interface between the hard and soft material extending to a cutting plane;
    a chassis pivotal on the support about a chassis axis transverse to the plane;
    an outer pulley pivotal on the chassis remote from the support and generally tangent to the plane;
    a carriage displaceable on the support transversely of the plane;
    an inner pulley pivotal on the carriage close to the support a chain spanning said outer and inner pulleys for engaging and cutting said meat; and spaced along the plane from the outer pulley; and
    drive means connected to one of the pulleys for rotating same and advancing the chain.

2. The apparatus defined in claim 1 wherein the drive means is connected to the outer pulley.

3. The apparatus defined in claim 1 wherein the chassis is provided with transversely extending guide rods carrying the carriage, the apparatus further comprising
    a transversely expansible and contractile fluid-powered actuator braced between the carriage and the chassis.

4. The apparatus defined in claim 1, further comprising
    a stationary base, the support being pivoted on the base about a base axis generally coinciding with the plane and generally perpendicular to the chassis axis.

5. The apparatus defined in claim 1, further comprising
    a fluid-powered actuator expansible and contractile generally in the plane and connected between the support and the chassis for pivoting same about the chassis axis.

6. The apparatus defined in claim 1, further comprising
    a guide element extending generally in the plane and engageable with the object;
    means supporting the element on the base for pivoting about an element axis parallel to the chassis axis for movement of the element generally in the plane.

7. The apparatus defined in claim 1, further comprising
    respective actuator means for transversely displacing the carriage on the chassis and for pivoting the chassis about the chassis axis on the support; and
    control means connected to all of the means for sequentially starting from a position with the chain spaced from the object and both pulleys laterally to one side of the plane
        pivoting the chassis forward on, the support and thereby engaging the chain in the meat on the one side of the plane,
        displacing the carriage transversely to pull the inner pulley at least partially to the other side of the plane and thereby moving the chain in the object toward the plane while rotating the pulleys and advancing the chain,
        pivoting the chassis further forward on the support and thereby sliding the chain along the interface and separating the hard material from the soft material while slowing pulling the inner pulley toward the one side, and
        stopping rotation of the pulleys and pivoting the pulleys backward on the support.

8. The apparatus defined in claim 1 wherein the object is a gutted fowl body and the holding means engages the body internally with the sternum aligned with the plane.

9. The apparatus defined in claim 8, further comprising
    respective actuator means for transversely displacing the carriage on the chassis and for pivoting the chassis about the chassis axis on the support; and
    control means connected to all of the means for sequentially starting from a position with the chain spaced from the object and both pulleys laterally to one side of the plane
        pivoting the chassis forward on the support and thereby engaging the chain in the meat on the one side of the plane,
        displacing the carriage transversely to pull the inner pulley at least partially to the other side of the plane and thereby moving the chain in the object toward the plane while rotating the pulleys and advancing the chain, pivoting the chassis further forward on the support and thereby sliding the chain along the interface and separating the hard material from the soft material while slowing pulling the inner pulley toward the one side, and stopping rotation of the pulleys and pivoting the pulleys backward on the support.

10. A method of operating an apparatus for separating a soft material such as meat from a hard material such as bone and comprising:

a generally stationary support;

means for holding an object comprised of the hard and soft materials stationarily adjacent the support with an interface between the hard and soft material extending to a cutting plane;

a chassis pivotal on the support about a chassis axis transverse to the plane;

an outer pulley pivotal on the chassis remote from the support and generally tangent to the plane;

a carriage displaceable on the support transversely of the plane;

an inner pulley pivotal on the carriage close to the support and spaced along the plane from the outer pulley; and a chain spanning said outer and inner pulleys for engaging and cutting said meat; the method comprising the steps of sequentially pivoting the chassis forward on the support and thereby engaging the chain in the meat on the one side of the plane;

displacing the carriage transversely to pull the inner pulley at least partially to the other side of the plane and thereby moving the chain in the object toward the plane while rotating the pulleys and advancing the chain; and pivoting the chassis further forward on the support and thereby sliding the chain along the interface and separating the hard material from the soft material while slowing pulling the inner pulley toward the one side.

11. The method defined in claim 10 wherein the object is a gutted bird body, the method further comprising the step of supporting the bird body with its sternum generally aligned with the cutting plane.

12. The method defined in claim 10, further comprising the step after pivoting of the chassis further forward of stopping rotation of the pulleys and pivoting the pulleys backward on the support.

* * * * *